United States Patent [19]

Atarashi

[11] Patent Number: 4,552,399
[45] Date of Patent: Nov. 12, 1985

[54] GLOVE BOX ON VEHICULAR INSTRUMENT PANEL

[75] Inventor: Kazuya Atarashi, Saitama, Japan

[73] Assignee: Honda Giken Kogyo Kabushiki Kaisha, Tokyo, Japan

[21] Appl. No.: 623,479

[22] Filed: Jun. 22, 1984

[30] Foreign Application Priority Data

Jun. 22, 1983 [JP] Japan .............................. 58-94980[U]

[51] Int. Cl.[4] ................................................ B60R 7/06
[52] U.S. Cl. .......................... 296/37.12; 292/DIG. 22
[58] Field of Search .................... 296/37.12, 37.8, 70;
  292/DIG. 22, 201, 96

[56] References Cited

U.S. PATENT DOCUMENTS 3,132,892  5/1964  Stevens ............................ 296/37.12
4,355,837  10/1982  Shinizu et al. .................... 296/37.12

FOREIGN PATENT DOCUMENTS 1073092  9/1954  France .
961469  6/1964  United Kingdom .

Primary Examiner—Robert R. Song
Attorney, Agent, or Firm—Lyon & Lyon

[57] ABSTRACT

A glove box for the upper surface of an automobile dashboard whereby it may be positioned close to the driver. The glove box lid is pivotally supported by arms extending down either side to swing forwardly for opening. A hook is pivotally support adjacent an arm and weighted to swing into engagement with the arm to prevent opening of the lid during abrupt deceleration. A toggle spring assists in maintaining the lid in either the open or closed position.

13 Claims, 3 Drawing Figures

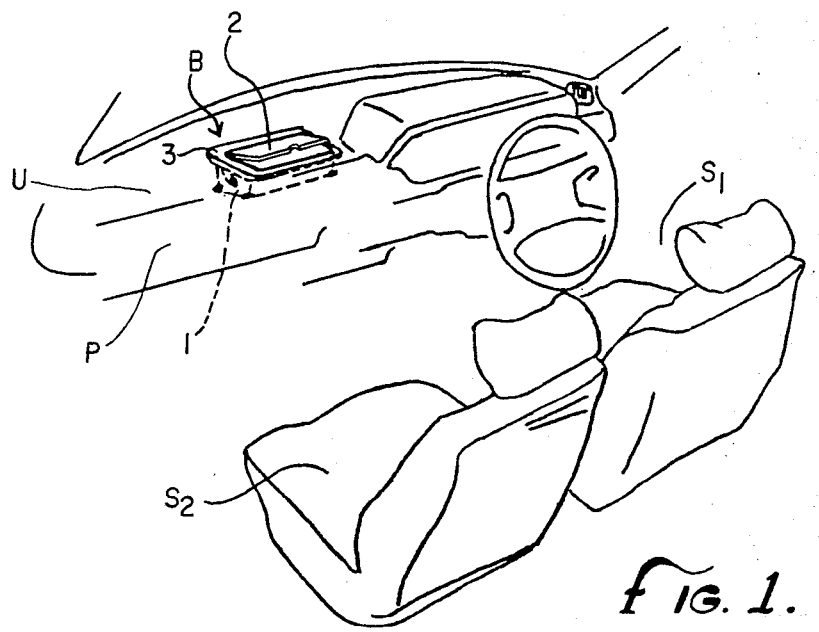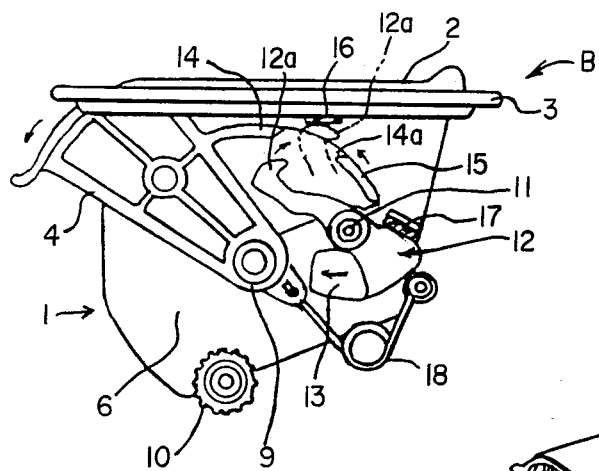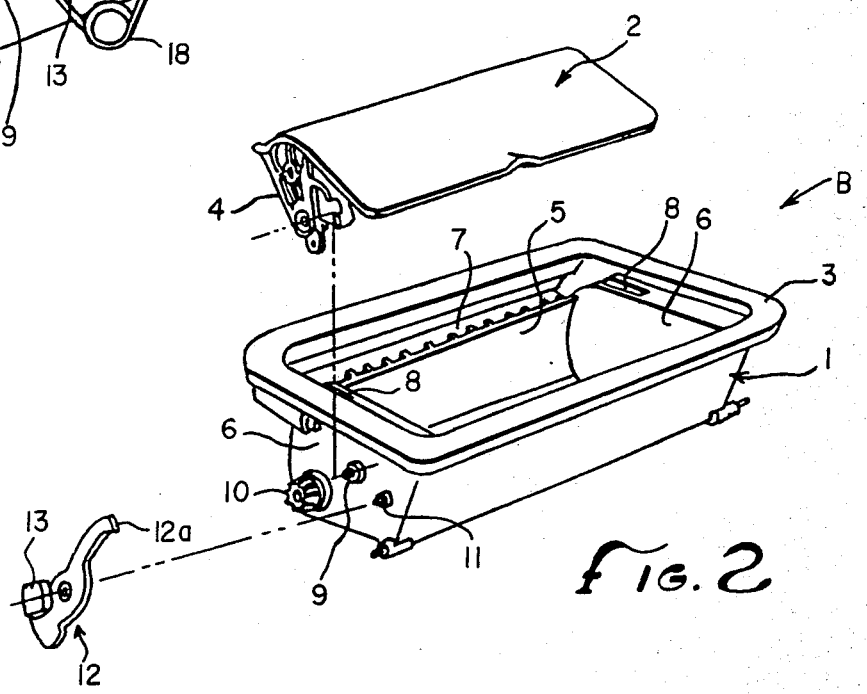

GLOVE BOX ON VEHICULAR INSTRUMENT PANEL

The present invention relates to a glove box to be mounted in the instrument panel of a vehicle for accommodating small articles and, more particularly, to a glove box which is provided with a lid made movable in the forward direction of the vehicle for forming an opening through which small articles are to be accommodated in the glove box.

A vehicle such as an automobile is provided with a dashboard at the front of the passenger compartment which in front of a driver's seat includes an instrument panel for accommodating accessories such as meters, a clock or a radio set. The glove box is usually placed on the passenger side portion of the dashboard and, as a result, the glove box is so remote from the driver's seat that the driver cannot conveniently and safely insert and remove small articles from the glove box, particularly while driving. It is therefore desired that a glove box for the driver be additionally placed within the reach of the driver's seat. The upper face at the central portion of the dashboard is suitable as a place for mounting the glove box for the driver.

Here, in order that the glove box for the articles may allow the driver to easily insert and remove articles even during his driving operation, the box cover, i.e., the lid has to be easily opened or closed by the single hand of the driver. In view of the operability, therefore, it is preferable that the lid be opened forward, i.e., in the forward running direction of the vehicle. It is also preferable that the operation of opening or closing the lid can be effected easily without any substantial resistance.

If the lid is easily opened forward, however, it may be opened by its own inertia, such as when a high deceleration is applied to the vehicle in the abrupt braking operation of the vehicle, to create an undesirable distraction and a risk that the small articles accommodated in the box may be scattered around the vehicle.

In order to prevent the lid from being opened during the abrupt braking operation of the vehicle, it is conceivable to provide a mechanism similar to the locking mechanism normally used in the passenger-side glove box or the like. However, such a locking mechanism must be operated each time the lid is opened or closed, which is troublesome to the driver while he is driving. Moreover, since such a locking mechanism is generally mounted in the box, and since the glove box must be relatively small as a result of being mounted on the upper face of the instrument panel, the glove box has its volume further reduced even further if it is provided with that locking mechanism. Moreover, this locking mechanism is frequently so complicated that its assembly requires additional labor, trouble and cost.

The present device has been conceived so as to solve the problems and has a major object to provide a glove box on the dashboard of a vehicle near the driver, which is enabled to lightly open its lid in the forward direction of the vehicle so that the driver can easily open or close the lid and to have its lid automatically locked and prevented from being opened without fail when it is subjected to a high deceleration as in the abrupt braking operation of the vehicle.

Another object of the present device is to provide a glove box which is of a maximum size by eliminating any locking mechanism and which therefore also is easy to assemble.

In order to achieve the above-specified objects, the glove box according to the present device is characterized in that a hook having a weight at its one end is hinged in a swinging manner to a stationary portion, and in that a lid to be opened in the forward direction of the vehicle is integrally formed with an engagement portion which can be engaged by the hook so that when the hook is swung in the direction opposite to the moving direction of the lid by the inertia of the weight during an abrupt braking operation of the vehicle the hook comes into engagement with the lid engagement portion thereby to prevent the opening of the lid.

The present device will be described in the following in connection with one embodiment thereof with reference to the accompanying drawings.

FIG. 1 is perspective view of the front portion of the vehicle compartment of a right-hand drive automobile illustrating a preferred location for the glove box of the present invention.

FIG. 2 is an enlarged, exploded, perspective view of the glove box of this invention shown in FIG. 1.

FIG. 3 is a side elevation view of the glove box of this invention shown in FIGS. 1 and 2.

As shown in FIG. 1, a dashboard and instrument panel P is disposed in front of a driver's seat $S_1$ and a passenger's seat $S_2$ in the compartment of a vehicle. That panel P is formed on its upper face with a generally horizontal surface U, which is arranged at its central portion with a glove box B for accommodating small articles. This glove box B is positioned within the reach of the hand of the driver while he is seated on the driver's seat $S_1$.

As shown in FIG. 2, the glove box B is comprised of a housing having a center pocket 1, which is formed with an accommodating portion for receiving and storing small articles, and a lid 2 which provides the cover for the accommodating portion. The glove box housing is supported on the instrument panel P by means of a flange 3 which is formed in the upper edge around the opening of the accommodating portion of the center pocket 1.

The lid 2 is integrally molded with arms 4 at both sides of the front portions, i.e., the portions which are located toward the front when it is attached to the vehicle. In the front wall 5 of the center pocket 1 and the front portions of side walls 6 adjacent to the front wall 5, there are formed a longitudinal slot 7 and transverse slots 8 on each side, through which the lid 2 and the arms 4 extend. Moreover, the side walls 6 of the center pocket 1 are formed at their central portions with outwardly projecting pivots 9 by which the arms 4 of the lid 2 are pivotally supported. The pivots 9 are a substantial distance below the flange 3 and toward the front of the opening covered by the lid 2 whereby the pivoting of arms 4 on pivots 9 simulates a sliding motion of the lid 2 rather than an abrupt, hinged motion if the lid were merely pivotally mounted on flange 3. Thus, the lid 2 can swing back and forth so that it opens the accommodating portion of the center pocket 1, when it swings forward, and closes the same when it swings rearward. The side wall 6 of the center pocket 1 is provided at its lower portion with a stopper 10 so that, when the lid 2 is opened, its arm 4 comes into abutment against the stopper 10 to prevent the excessive swing of the lid 2 in the forward direction. To the abutment face of that stopper 10, there is attached an elastic member of rubber or the like, by which there arises no noise when the arm 4 comes into abutment. The abutment face of the center pocket 1 against the lid 2 is also provided with a rubber cushion by which there arises no noise when the lid 2 is closed.

As is apparent from FIGS. 2 and 3, one side wall 6 of the center pocket 1 is provided rearwardly of the pivot 9 with another pin 11, on which a hook 12 is hinged at its central portion in a swinging manner. The hook 12 is provided at its lower end portion with a weight 13 so that the hook 12 is normally held in a forward tilted position by the gravity of the weight 13, as shown in solid lines in FIG. 3. This weight 13 plays the role of an acceleration sensor so that it is moved forward by its inertia, when it is subjected to a high deceleration during the abrupt braking operation of the vehicle, thereby to swing the hook 12 clockwise in FIG. 3 on the pin 11. The arm 4 of the lid 2 is formed toward the rear with an arcuate portion 14 with a radius centered on the pivot 9 and which is formed with an engagement portion 15 at its rear end by a notch 14a. That engagement portion 15 is made engageable with a hooked portion 12a formed at the leading end of the hook 12.

A rubber cushion 16 is also placed in a position where the hooked portion 12 at the leading end of the hook 12 comes into abutment against the center pocket 1 when the hook 12 swings clockwise. That cushion 16 prevents the hook 12 from abutting against the center pocket 1 to generate a noise and restricts the swinging range of the hook in the abrupt braking operation of the vehicle thereby to perform the function of properly positioning the hook 12 so that its hooked portion 12a and the engagement portion 15 integral with the arm 4 may engage consistently. In order to restrict the counterclockwise swing of the hook 12, moreover, the center pocket 1 is provided with a cushion stopper 17 of rubber or the like in a position to correspond to the back of the lower end portion of the hook 12. Thus, the hook 12 is allowed to swing only between the cushion 16 and the stopper 17 so that no noise will be generated even when the hook 12 swings during the running operation of the vehicle.

Since the lid 2 is merely hinged to the center pocket 1 through the pivots 9, as has been described above, its opening or closing operation can be conducted with ease. In the present embodiment, in order to improve the smooth opening and closing operation, a toggle spring 18 is interposed between the center pocket 1 and the arm 4 of the lid 2. That toggle spring 18 lightly biases the arm 4 in the opening direction when the lid 2 is opened and in the closing direction when the lid is closed. As a result, if the lid 2 is opened a small amount, the lid 2 will be urged to a fully opened position by the action of the spring 18 even if it is released from the driver's hand. If the lid 2 is closed a small amount from its opened position, on the otherhand, it will be urged to a completely closed position by the action of the spring 18. With the lid 2 closed, moreover, a force against opening the lid 2 is applied by that spring 18 so that the lid 2 is inhibited from being opened merely by moderate decelerating the vehicle. If the toggle spring 18 is made stronger, however, a stronger force is required to open or close the lid 2 so that the driver finds it difficult to operate the lid 2. Therefore, it is undesirable for the spring 18 to be made stronger so that the lid 2 cannot be prevented from being opened during the abrupt deceleration of the vehicle by the action of the spring 18.

Incidentally, the engagement portion 15 of the arm 4, the hook 12 and the toggle spring 18 may be disposed at both the side walls 6 of the center pocket 1. Moreover, only the toggle spring 18 may be disposed at the other side wall 6.

Next, the operations of the glove box B thus constructed will be explained in the following. Since neither large acceleration nor deceleration is generated while the vehicle is in its normal running operation, the hook 12 remains in substantially the position shown by the solid lines in FIG. 3 by the gravity of the weight 13. In this position, the hooked portion 12a of the hook 12 is positioned below the swinging locus of the engagement portion 15 of the arm 4, i.e., below an arc drawn on the pivot 9 by the engagement portion 15 so that they do not engage. As a result, there is no obstruction against the opening or closing operation of the lid 2 so that the driver can take out an article from the glove box or replace article in the box even while he is driving the vehicle.

When the vehicle is abruptly braked, it is subjected to a high deceleration. As a result, a strong inertia is exerted upon the weight 13 so that the hook 12 is swung clockwise of FIG. 3 to bring its hooked leading end portion 12a into abutment against the cushion 16, as indicated by a phantom line. Meanwhile, the inertia also is exerted upon the lid 2 so that the lid 2 tends to be moved forward. As a result, the arm 4 integral with the lid 2 is swung counter-clockwise on the pivots 9. Since, at this time, the hooked portion 12a of the hook 12 is positioned on the swinging locus of the engagement portion 15 of the arm 4, they come into engagement. If the hook 12 and the arm 4 engage, their centers of swinging motion are differently located on the pin 11 and the pivot 9, respectively, so that they lock each other. Thus, the arm 4 is blocked from any swinging motion so that the lid 2 is prevented from being opened.

In case the vehicle returns to the normal motion after such abrupt deceleration, the lid 2 is at once fully closed. Then, the hook 12 is disengaged from the engagement portion 15 so that it is returned again to the position shown by the solid lines of FIG. 3 by gravity acting on the weight 13.

In the locking mechanism of the lid 2 thus far described, the hook 12 can be maintained in an "at-rest; position where it is pivoted clockwise by a predetermined angle from an unobstructed free position, by suitably selecting the position and thickness of the cushion stopper 17. Thus, the hook 12 will be adapted to remain in engagement during normal deceleration and only pivot upon a predetermined deceleration. Moreover, the stopper 17 may be interposed between the upper end of the hook 12 and the arm 4 rather than in the location illustrated in FIG. 3.

In the embodiment thus far described, the opening for the glove box is formed by swinging the lid forward on the pivots 9. However, the lid opening preventing mechanism thus far described can also be applied to such a glove box wherein the lid 2 is made integral with the center pocket 1 so that the opening for accommodating articles is formed when the whole structure is swung forward. In such a case, the hook 12 is hinged to the stationary portion of the instrument panel P or the like.

As has been described hereinbefore, according to the present device, a glove box is mounted on the dashboard and instrument panel of the vehicle and is provided with a lid movable forward of the vehicle for forming the opening, and a hook is made detective of high deceleration during an abrupt braking operation of the vehicle for swinging motion to retain the lid. Thus, during the abrupt braking operation, the lid is automatically locked so that it is prevented from being opened to allow the articles to fly out of the glove box. As a result, the lid can be adapted to be lightly opened or closed to provide the box for accommodating the small articles, which is easy to handle during by the driver even while driving. Moreover, the locking mechanism such as the hook for preventing the lid from being opened is disposed outside of the accommodating portion of the glove box. As a result, the accommodating space is not reduced and the cost is reduced.

What is claimed:

1. A glove box for the upper surface of a vehicle dashboard, comprising, means for mounting on the dashboard upper surface and having pocket for receiving articles, a lid means for covering said pocket and movable forward to open said pocket, means for engaging said lid means and preventing said forward movement upon deceleration of the vehicle.

2. The glove box of claim 1 wherein said lid means includes a pair of downwardly extending arms pivotally mounted on the first said means.

3. The glove box of claim 1 wherein said lid engaging means includes a hook member pivotally mounted on a horizontal, transverse axis and having weight means below said pivotal mounting for causing pivoting of said hook member into said engagement upon said deceleration.

4. The glove box of claim 3 wherein means are provided for arresting the pivotal movement of said lid engaging member in both directions in a quiet manner.

5. The glove box of claim 3 wherein means are provided for maintaining said lid engaging means in forwardly pivoted position normally supporting said weight means for preventing pivotal movement of said lid engaging means except upon the deceleration exceeding a predetermined magnitude.

6. The glove box of claim 3 wherein said lid means includes a pair of arms pivotally mounted on the said means for mounting on the dashboard and at least one of said arms is provided with an engagement portion for engagement by said hook member.

7. The glove box of claim 1 wherein toggle spring means are provided and engage said lid means for resiliently retaining said lid means in the open or closed position.

8. The glove box of claim 2 wherein the first said means includes slots along the extremeties thereof at both sides for accommodating said arms and at the front for the lid means to pass through, and said arms are pivotally mounted on the outside of the first said means.

9. The glove box of claim 2 wherein said lid engaging means includes a hook member pivotally mounted on a horizontal, transverse axis and having weight means below said pivotal mounting for causing pivoting of said hook member into said engagement upon said deceleration.

10. The glove box of claim 9 wherein means are provided for arresting the pivotal movement of said lid engaging member in both directions in a quiet manner.

11. The glove box of claim 9 wherein means are provided for maintaining said lid engaging means in forwardly pivoted position normally supporting said weight means for preventing pivotal movement of said lid engaging means except upon the deceleration exceeding a predetermined magnitude.

12. A glove box for the upper surface of a vehicle dashboard wherein the glove box has a housing with an upwardly facing pocket for articles and a generally horizontal lid for covering the pocket, the improvement comprising, the lid having a pair of downwardly depending arms pivotally mounted on the side of housing for opening the pocket by pivotally moving the lid forwardly, a hook member pivotally mounted on the side of the housing, said hook member having weight means located below said pivotal mounting for urging said hook member, by gravity, toward a first position, said lid arms and hook member having interengaging means for said hook member to prevent opening forward movement of said arms and lid in a second position of said hook member, and said hook member being pivoted to said second position upon deceleration of the vehicle.

13. A glove box for recessed mounting in an opening in the upper surface of a vehicle dashboard, comprising, a housing adapted to fit in that opening and having an encircling flange for supporting the housing on the dashboard to close that opening, said housing having an upwardly facing pocket for receiving articles, a lid for covering said pocket, said lid having integral downwardly depending arms on each internal side, said housing having slots on each lateral side adjacent said flange for the said arms to pass through, means pivotally connecting said arms to the outer sides of said housing, a slot in the upper front of said housing adjacent said flange for allowing the lid to pass through upon forward pivoting of said arms to open the glove compartment, a hook member pivotally mounted on the outer side of the housing rearwardly of the pivotal mounting of said arms, said hook member having a forwardly and upwardly extending portion with a hook shape, said arm adjacent said hook member having an engagement portion for interengagement with the hook shaped portion of said hook member with the said lid closed, and weight means on said hook member below the pivotal mounting thereof for causing pivoting of said hook member into said interengagement with said arm engagement portion upon deceleration of the vehicle to maintain the lid closed.

* * * * *